United States Patent [19]
Yamakawa et al.

[11] Patent Number: 5,742,575
[45] Date of Patent: Apr. 21, 1998

[54] METHOD AND DEVICE FOR IDENTIFYING DISC

[75] Inventors: Akio Yamakawa, Kanagawa; Masamichi Utsumi, Chiba, both of Japan

[73] Assignee: Sony Corporation, Japan

[21] Appl. No.: 694,544

[22] Filed: Aug. 9, 1996

[30] Foreign Application Priority Data

Aug. 18, 1995 [JP] Japan ................................ 7-232062

[51] Int. Cl.$^6$ ................................................ G11B 7/00
[52] U.S. Cl. ........................ 369/58; 369/54; 369/109
[58] Field of Search ........................ 369/13, 54, 59, 369/58, 109

[56] References Cited

U.S. PATENT DOCUMENTS

| | | | |
|---|---|---|---|
| 5,056,075 | 10/1991 | Maruta et al. | 369/58 |
| 5,168,483 | 12/1992 | Oka et al. | 369/13 |
| 5,289,451 | 2/1994 | Ashinuma et al. | 369/58 |
| 5,530,687 | 6/1996 | Yamaguchi | 369/54 |
| 5,644,561 | 7/1997 | Son et al. | 369/58 |

FOREIGN PATENT DOCUMENTS

| | | |
|---|---|---|
| 1-176365 | 7/1989 | Japan. |
| 5-258450 | 10/1993 | Japan. |

*Primary Examiner*—David C. Nelms
*Assistant Examiner*—Kim-Kwok Chu
*Attorney, Agent, or Firm*—Ronald P. Kananen

[57] ABSTRACT

The type of optical disc having different track pitch is identified simply. A light emitted from the LED 21 is irradiated through a condenser lens 22 onto an optical disc 1. The incident light is diffracted and reflected by the pit 3. When, if the optical disc 1 is a CD, the first order diffracted light is received by the first light receiver 10, on the other hand, if the optical disc 1 is a DVD having a smaller track pitch Pt, the first order diffracted light is received by the second light receiver 11. Therefore, the type of the optical disc 1 is identified based on a light receiving signal of the first light receiver 10 and the second light receiver 11.

6 Claims, 9 Drawing Sheets

STRUCTURE OF AN OPTICAL DISK 5,742,575

METHOD AND DEVICE FOR IDENTIFYING DISC

BACKGROUND OF THE INVENTION

1. Field of the Invention

This invention relates to a method and device for identifying what type of the optical disc is placed on a disc player which accepts a plurality of types of the optical disc.

2. Description of the Related Art

Heretofore, optical discs with diameters of 8 cm, 12 cm, and 30 cm have been used. Disk players which accept a plurality of types of the optical disc identify the type of the optical disc dependently on difference in diameter of the optical disc because track pitch formed on an optical disc is the almost same for all optical discs with different diameters.

Recently, new various optical discs which have the same diameter as conventional compact discs (CD) but have the different track pitch, for example, digital video disc (DVD) (diameter of digital video disc is 12 cm), have been used.

Such a disc having the same diameter and different track pitch can not be identified by the conventional method for identification because the diameter is the same.

OBJECT AND SUMMARY OF THE INVENTION

Accordingly, it is the object of the present invention to provide a method and device for identifying the optical disc having the same diameter and different track pitch with a simple structure.

To accomplish the above-mentioned object, in the disc identifying method of the present invention, a light is irradiated onto a disc, then the light is diffracted on the disc, when the angle of diffraction of the first order diffracted light and the diffracted light of higher order is different dependently on the track pitch, the type of an optical disc having different track pitch is identified utilizing such difference in the angle of diffraction.

A light receiving means is provided at the position on the passage of any of diffracted lights of the first order or higher order having different angle of diffraction depending on track pitches, then the type of an optical disc is identified using the light receiving output from the light receiving means.

In the diffraction mechanism described above, the light irradiated onto the disc is irradiated with an incident angle which deviates by a certain angle from the perpendicular direction to the plane of the disc, and the certain angle is prescribed so that a diffracted light of the first order or higher order diffracted from a certain type of the disc out of various types of the disc returns through the optical path of the incident light toward the light source.

Next, to accomplish the object described herein above, a disc identifying device of the present invention is provided with a light source for irradiating a light onto the disc and a plurality of light receiving means for receiving any one of diffracted lights of the first order and higher orders diffracted from the track formed on the disc wherein the number of the light receiving means is equivalent to the number of types of the disc to be identified, the plurality of light receiving means is provided at the positions on the passages corresponding to each angle of a diffracted light which is different depending on the track pitch of each type of the disc, then the type of the disc is identified based on the light receiving signal.

Another disc identifying device of the present invention is provided with a light source for irradiating a light onto a disc, the first light receiving means for receiving the diffracted light of the zero order diffracted from the track formed on the disc, and a plurality of second light receiving means for receiving any one of diffracted lights of the first order and higher orders diffracted from the track formed on the disc, wherein the number of the light receiving means is equivalent to the number of types of the disc to be identified, the fist light receiving means detects the tilt angle of the disc on the light receiving position where the zero order diffracted light is received, and the plurality of the second light receiving means is provided at the positions corresponding to each angle of the diffracted lights different dependently on the track pitch which is different for each type of a disc and identifies the type of the disc based on the light receiving signal.

Yet another disc identifying device of the present invention is provided with a light source for irradiating a light on a disc with an angle deviated by a prescribed degree from the direction perpendicular to the plane of the disc, and a light receiving means for receiving any one of diffracted lights of the first order and higher orders diffracted from the track formed on the disc of a certain type out of various types of the disc and provided very closely to the light source, only when this light receiving means detects a light receiving signal, the light receiving means identifies the disc to be the disc of the certain type.

According to the disc identifying method and disc identifying device of the present invention, if the track pitch of a optical disc is different from other optical discs, the angle of the diffracted lights of the same order deviates by several degrees each other, therefore the type of the disc can be identified consistently.

As described herein above, in the present invention, the difference in the angle of diffraction dependent on the difference of track pitch formed on optical discs is utilized to identify the type of the optical disc, therefore the mechanism for identification is very simple. By irradiating a light with an angle deviated by a prescribed degree from the direction perpendicular to the plane of the disc, for a certain type of optical disc, the diffracted light returns toward the light source, therefore the light source and light receiver are integrated.

The light source of tilt sensor is also served as the light source for identification of an optical disc.

DETAILED DESCRIPTION OF THE PREFERRED EMBODIMENTS

Figure 1:
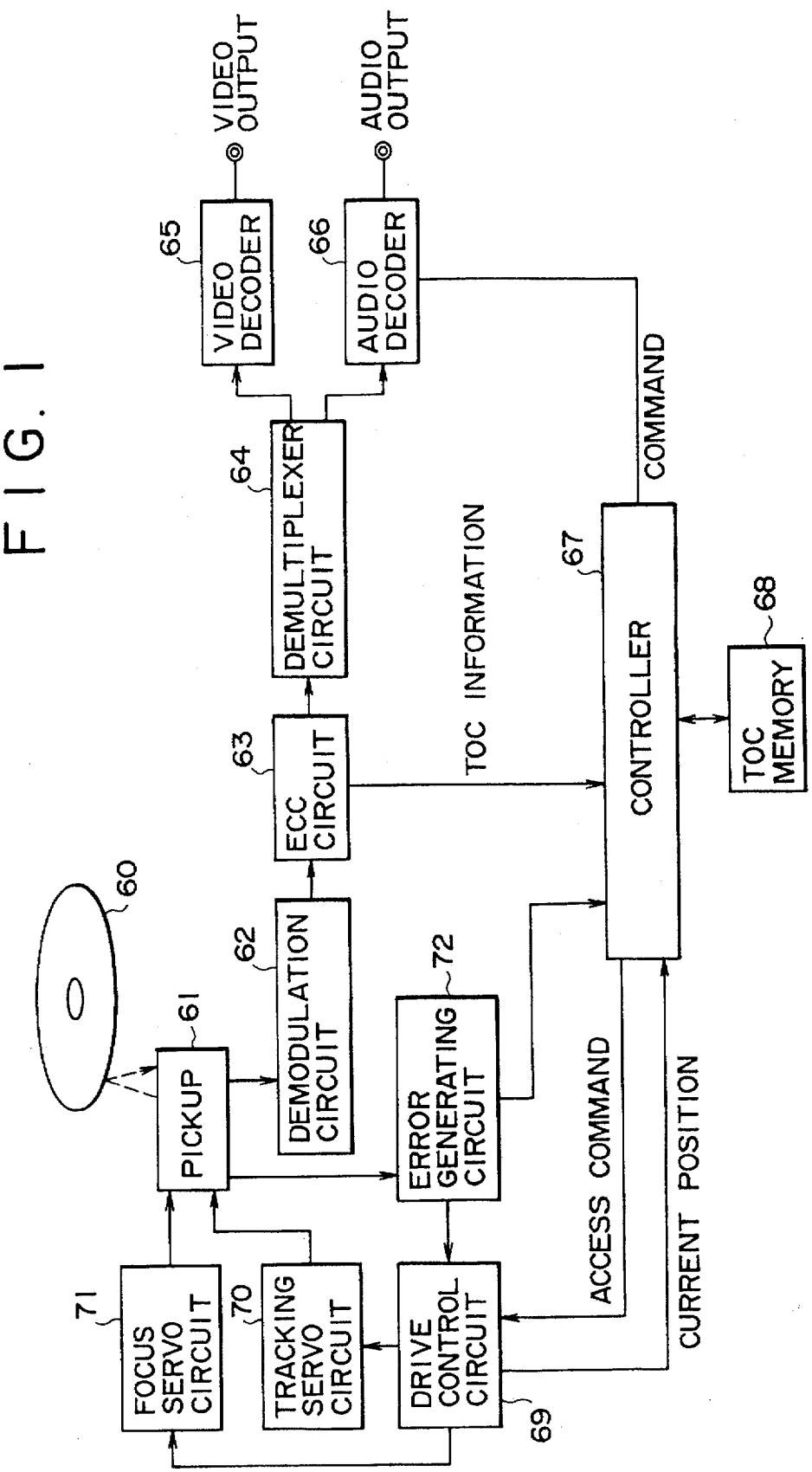
FIG. 1 is a schematic block diagram for illustrating the structure of a disc player applied with the present invention.

First, a schematic block diagram for illustrating the structure of a disc player applied with the present invention is shown in FIG. 1.

In the figure, an optical disc 60 is an optical disc such as CD or DVD, a light is irradiated from a pickup 61 onto the optical disc 60, the pickup 61 receives the reflected light and reads data stored in the optical disc 60.

Data read by the pickup 61 are subjected to equalization processing and demodulation processing in a demodulation circuit 62. The demodulated data are subjected to error correction processing in an ECC circuit 63, and an error is corrected if it is included. In the ECC circuit 63, record content information, namely TOC information (Table Of Contents), in the optical disc 60 is detected and fed to a controller 67. The TOC information is written in the TOC memory device 68 by the controller 67 and used when controlling for playing back.

The error corrected data is fed to a demultiplexer circuit 64, and split to video data and audio data, the video data are fed to a video decoder 65 and the audio data are fed to an audio decoder 66.

In the video decoder 65, the video data which had been subjected to compression processing for recording are subjected to extension processing and D/A conversion processing and then the video decoder 65 outputs an analog video signal.

In the audio decoder 66 similarly to the video decoder 65, the audio data compressed for recording are subjected to extension processing and D/A conversion processing and then the audio decoder 66 outputs an analog audio signal.

The video output signal is displayed on a display device by a picture display circuit not shown in the figure and also the audio output signal is sounded by the audio output circuit.

An error generating circuit 72 generates a focus error signal and tracking error signal for focus controlling and tracking error controlling of the pickup 61. The focus error signal and tracking error signal generated by the error generating circuit 72 are fed to a drive control circuit 69, the drive control circuit 69 drive-controls a tracking servo circuit 70 and drive-controls a focus servo circuit 71 based on the error signal fed from the error generating circuit 72. Thus, the pickup 61 executes right focus control and right tracking control, and data are read rightly from the optical disc 60.

The controller 67 receives a current position information of playback position from the drive control circuit 69, and playback-controls the whole disc player based on TOC information stored in the TOC memory device 68. In addition, the controller 67, when receiving a signal, which informs the failure of control operation such as a failure of focusing due to a flaw on the optical disc 60 and plane deviation of the optical disc 60, from the error generating circuit 72, transmits an access command to the drive control circuit 69 to cope with a trouble.

The disc player is assumed to be a disc player for playing back two types of optical disc 60, for example, CD and DVD, for playing back a CD placed on the disc player and for playing back a DVD placed on the disc player, the disc player should be set differently correspondingly to the selection of optical disc, that is, circuits such as the equalizing circuit (EQ circuit) in the demodulation circuit 62, focus gain and focus bias of the focus control circuit, and the tracking circuit should be switched correspondingly to the selected type of an optical disc 60 placed on the disc player.

Figure 2:
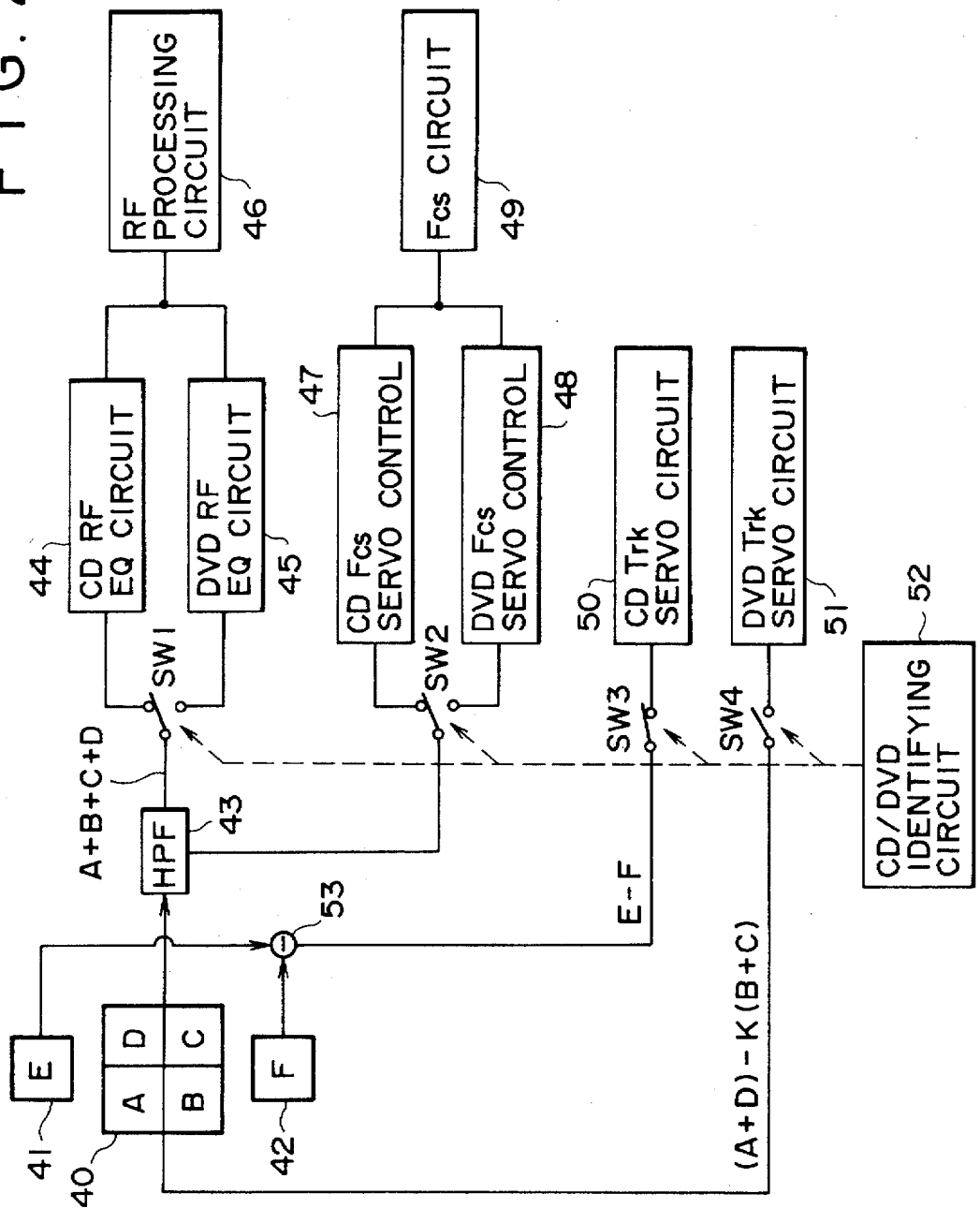
FIG. 2 is a schematic block diagram for illustrating the structure of a disc identifying device of the present invention.

The mechanism capable of the automatic switching is the disc identifying method of the present invention, the schematic diagram of the structure is shown in FIG. 2. The structure shown in FIG. 2 is not shown in FIG. 1, but actually the structure is provided in FIG. 1.

In FIG. 2, numerals 40, 41, and 42 represent a optical detector divided to six pieces which are provided on the pickup 61. A (A+B+C+D) signal which is formed by addition of four detection signals of A, B, C, and D from four optical detectors is generated, and fed as RF signal to a switch SW1 through a high pass filter (HPF) 43, and also as focus-on signal to a switch SW2 through HPF 43. A signal of difference between added values of two diagonal pairs formed of four optical detectors 40 of A, B, C, and D, namely {(A+C)−(B+D)} signal, is generated and fed to the switch SW2 through HPF 43 as focus-error signal. The switch SW2 is shown in the figure as a structure having a single circuit but actually the switch SW2 has two circuits.

A subtracter 53 generates a signal of difference between the signals E and F from two optical detectors 41 and 42, namely (E−F) signal, as tracking error signal and fed it to the switch SW3, and also a signal of difference between two added values of horizontally adjacent optical detector pairs formed of four optical detectors 40, namely {(A+D)−K(B+C)} signal is formed as tracking error signal and fed to a switch SW4.

Switching of these switches SW1 to SW4 is controlled by a CD/DVD identifying circuit 52. The CD/DVD identifying circuit 52 identifies whether the optical disc set on the disc player is an CD or DVD according to the disc identifying method of the present invention.

When the CD/DVD identifying circuit 52 judges the optical disc set on the disc player to be a CD, the switches SW1 to SW4 are switched to the CD side as shown in the figure, RF signal (A+B+C+D) is fed to the CDRF equalizing circuit (EQ circuit) 44 through the switch SW1 for equalization, and then the RF signal is subjected to RF processing in the RF processing circuit 46.

The focus-on signal (A+B+C+D) and focus error signal {(A+C)−(C+D)} are fed to focus gain for CD and the CD focus (Fcs) servo control circuit 47 of the focus bias respectively through the switch SW2, outputs are fed to the focus (Fcs) circuit 49 for focus servo controlling.

In addition, a tracking error signal (E−F) is fed to the CD tracking (Trk) servo circuit 50 through the ON-switch SW3 for tracking servo controlling. Then, the switch SW4 is turned off.

On the other hand, the CD/DVD identifying circuit 52 judges the optical disc set on the disc player to be a DVD, the switch SW1 to switch SW4 are switched to the DVD side differently from the figure, a RF signal (A+B+C+D) is fed to the DVDRF equalizing circuit (EQ circuit) 45 through the switch SW1 for equalizing, then the RF signal is subjected to RF processing in the RF processing circuit 46.

A focus-on signal (A+B+C+D) and focus error signal {(A+C)−(B+D)} are fed to the focus gain for DVD and DVD focus servo control circuit 48 respectively through the switch SW2, output signals are fed to the focus circuit 49 for focus servo controlling.

A tracking error signal Pt(b(A+C), b(B+D))+Pt(b(A+C), b(B+D)) is fed to the DVD tracking servo circuit 51 through the ON-switch SW4 for tracking servo control. Then the switch SW3 is turned off.

Figure 3:
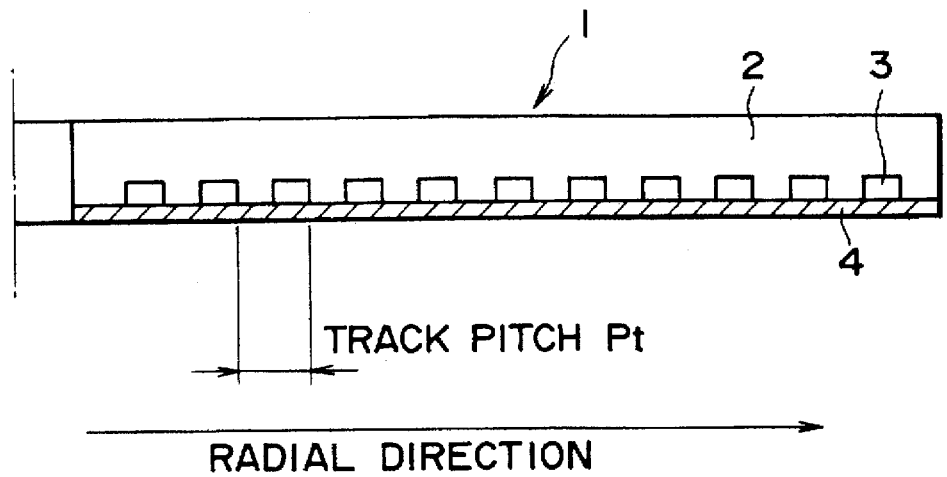
FIG. 3 is a schematic diagram for illustrating the structure of a optical disc.
Figure 4:
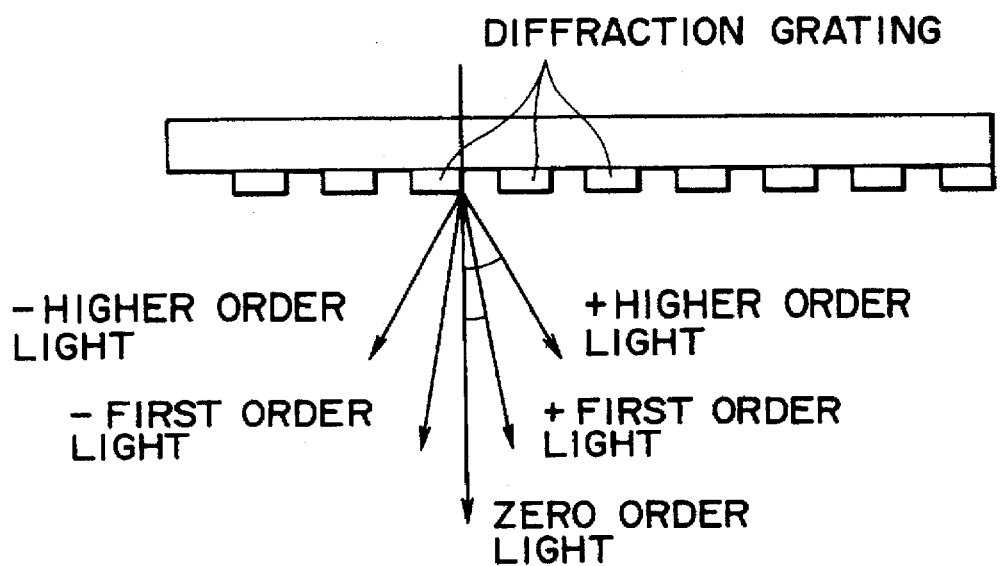
FIG. 4 is a schematic diagram for illustrating diffraction phenomenon for describing the principle of the present invention.
Figure 5:
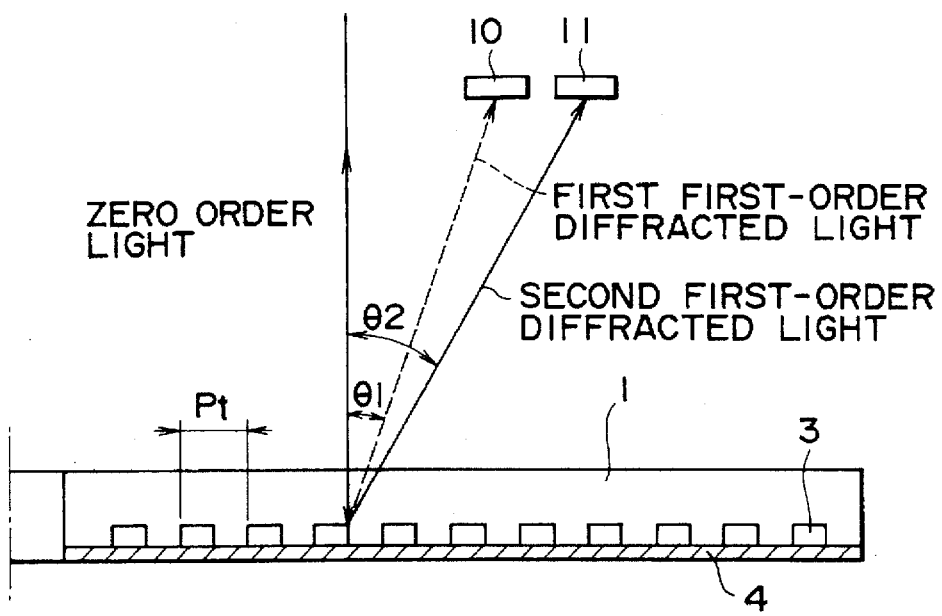
FIG. 5 is a schematic diagram for illustrating the principle of the present invention.

Next, the principle of the disc identifying method of the present invention is described referring to FIG. 3 to FIG. 5. FIG. 3 is a cross-sectional view of the structure of an optical disc, FIG. 4 shows diffraction of a light by a diffraction grating, and FIG. 5 is a diagram for illustrating the principle of the disc identifying device of the present invention.

As shown in FIG. 3, the pit 3 is formed on a reflection film 4 for reflecting a light provided on an optical disc 1 in a form of swirl which is swirling from the inside periphery to the outside periphery which carries recorded data thereon, and a protecting layer 2 for protecting the pit 3 and reflecting film 4 is formed thereon. In the figure of the optical disc as indicated by a arrow for indicating radial direction, the left side of the figure is the inside periphery and the right side of the figure is the outer periphery.

The pitch Pt of track formed on the optical disc 1 is the repeating interval in the radial direction of the pit 3 as shown in FIG. 3, and the pits 3 are arranged with an identical interval in the radial direction.

It is widely known that a light is diffracted by a diffraction grating, and when a coherent light is irradiated from the above onto a diffraction grating formed as shown in FIG. 4, the incident light is split to diffracted lights, namely, the zero order light which proceeds to the direction of the incident light, and other diffracted lights which proceed in deviated directions comprising the +first order light, +third order light, . . . , +higher order light, −first order light, −second order light, . . . , −higher order light.

When a light is irradiated onto an optical disc 1, the light is reflected by the reflection film 4, the intensity of reflected light is different dependently on the diffraction by the pit 3. The information recorded in the optical disc is read by reading the change of light intensity. For such optical disc 1, the change of the track pitch is regarded as the change of grid interval of a diffraction grating. The track comprising pits 3 arranged in the radial direction of the optical disc 1 is regarded as a diffraction grating.

When a light is irradiated from a light source of laser diode (LD) or light emitting diode (LED) onto an optical disc 1 as shown in FIG. 5, lights diffracted by the pit 3 are reflected and returns, and in such diffraction, though the zero order diffracted light out of diffracted lights returns to the direction of the light source, the first order diffracted light returns to the direction deviated from the incident light as shown in the figure.

In such case, the angle of deviation is different dependently on the interval of track pitch Pt. For example, the track pitch is 1.6 µm for the case that the optical disc 1 is a compact disc (CD), when, the first order diffracted light returns as the first first-order diffracted light shown in the figure with a rough dotted line, and θ1 represents the diffraction angle for CD. The track pitch is 0.84 µm for the case that the optical disc 1 is a digital video disc (DVD), when, the first order diffracted light returns as the second first-order diffracted light shown in the figure with a solid line, and θ2 represents the diffraction angle for DVD, which is larger than θ1.

The first light receiver 10 for receiving only the first first-diffracted light with the diffraction angle of θ1 is provided on the light path of the first first-order diffracted light, and the second light receiver 11 for receiving only the second first-order diffracted light with the diffraction angle of θ2 is provided on the light path of the second first-order diffracted light, and when the optical disc is a CD, only the first light receiver 10 receives the first first-order diffracted light of the incident light irradiated onto the optical disc 1, on the other hand, when the optical disc is a DVD, only the second light receiver 11 receives the second first-order diffracted light of the incident light irradiated onto the optical disc 1.

Therefore, by detecting a light receiving signal generated from the first light receiver 10 and the second light receiver 11, the type of optical disc 1 can be identified. In this case, even if the diameter of optical discs 1, for example CD and DVD, is the same, the type of optical disc 1 can be identified.

The angular difference between the diffraction angle θ1 and diffraction angle θ2 is usually in a range from about three degrees to several degrees, therefore the type of optical disc 1 is identified consistently.

Figure 6:
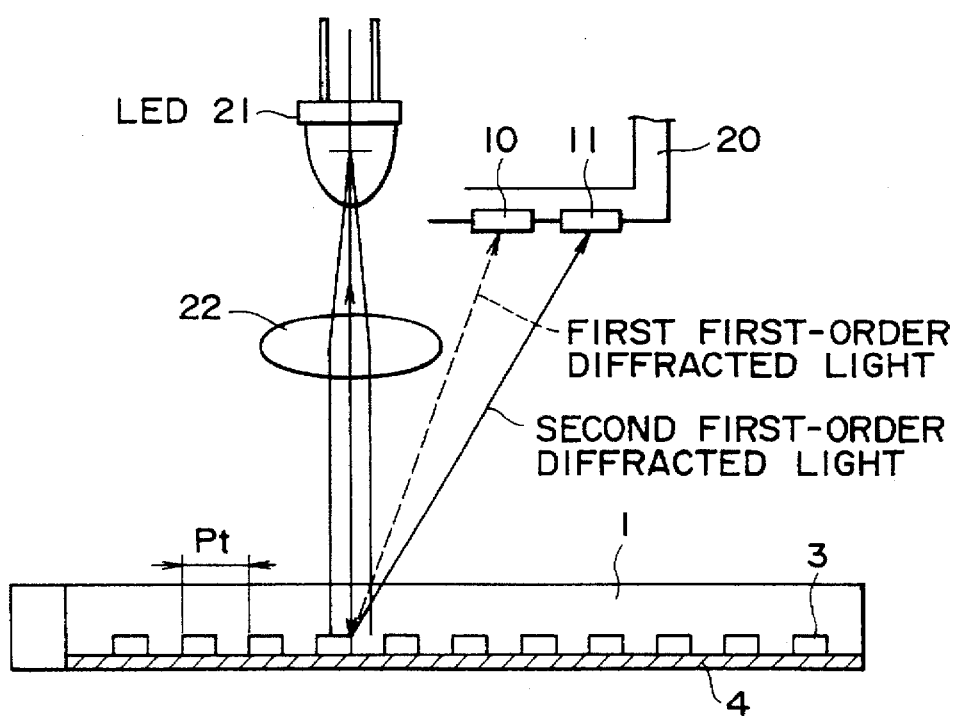
FIG. 6 is schematic diagram for illustrating the structure of the first embodiment of a disc identifying device in accordance with the disc identifying method of the present invention.

Next, a diagram for illustrating the structure of the first embodiment of a disc identifying device which is a realization of the disc identifying method of the present invention based on the principle described hereinbefore is shown in FIG. 6.

In this figure, an light emitting diode (LED) 21 is a light source for emitting a light for identifying the type of optical disc 1, the light from the LED 21 is collected by a condenser lens 22 and irradiated onto the optical disc 1. The light irradiated onto the optical disc 1 is diffracted by the pit 3 and reflected as the first first-order diffracted light. If the optical disc 1 is a CD, the first order diffracted light is reflected as the first order diffracted light and received by the first light receiver 10 provided on a pickup box 20. If the optical disc 1 is a DVD, the first order diffracted light is reflected as the second first-order diffracted light and received by the second light receiver 11 provided on a pickup box 20.

The zero order diffracted light diffracted by the pit 3 is collected by the condenser lens 22 and returns to the direction of the LED 21. In this case, by receiving the zero order diffracted light, information recorded in the optical disc is read from the received signal. In other words, by providing the first light receiver 10 and second light receiver 11 on the pickup box 20 for reading recorded information, the type of optical disc is identified. Another pickup may be provided independently for identifying the type of optical disc. The location where the first light receiver 10 and the second light receiver 11 are provided is determined based on the height of the pickup box 20 from the optical disc 1 and the angle of diffraction of the first order diffracted light corresponding to the track pitch Pt on which pickup box 20 the first light receiver 10 and the second light receiver 11 are provided.

The disc identifying device structured as described herein above starts operation when an optical disc 1 is loaded on the optical disc player to identify the type of a loaded optical disc. Based on the result of identification, the optical disc player switches the equalizing circuit, tracking gain, and tracking bias to sides suitable for the type of the optical disc 1 which is identified by the identifying device as described herein above. Thereby, the focus servo is operated and the tracking servo is operated.

Conventionally, by switching the tracking coefficient successively for optical discs with the same diameter, the tracking coefficient to be tracked is prescribed, however in the present invention, the type of the optical disc 1 is identified immediately after disc loading and before the operation of the focus servo and tracking servo, therefore the rise time for playback is shortened.

Figure 7A:
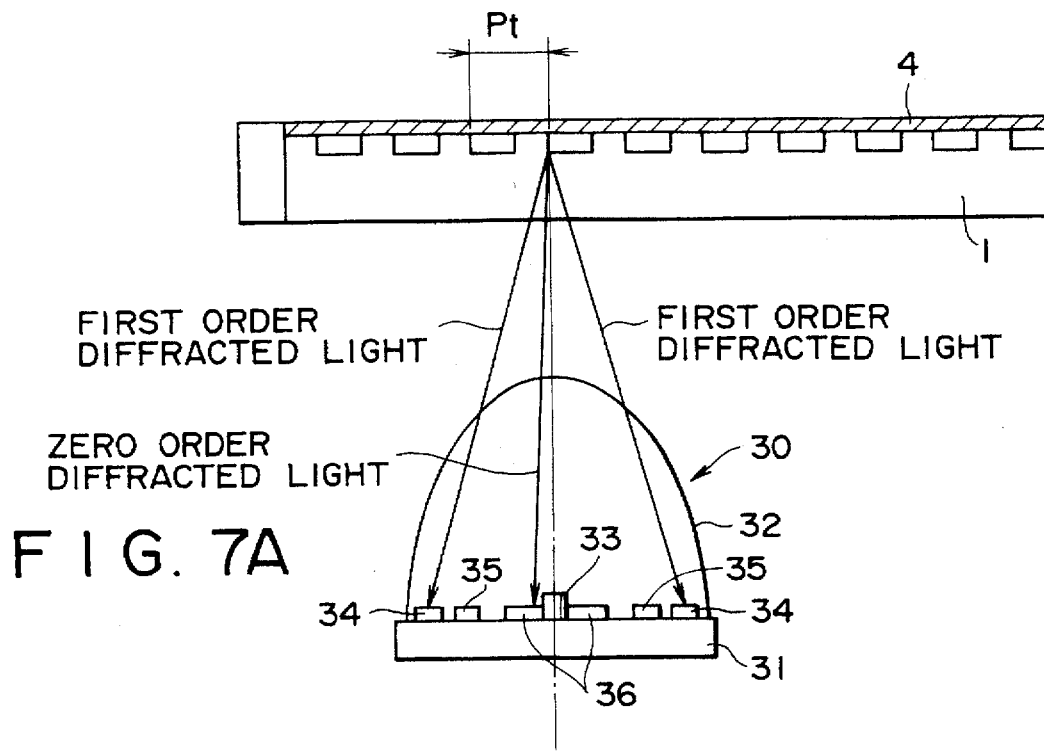
FIGS. 7A and 7B are schematic diagrams for illustrating the structure of the second embodiment of a disc identifying device of the present invention.
Figure 7B:
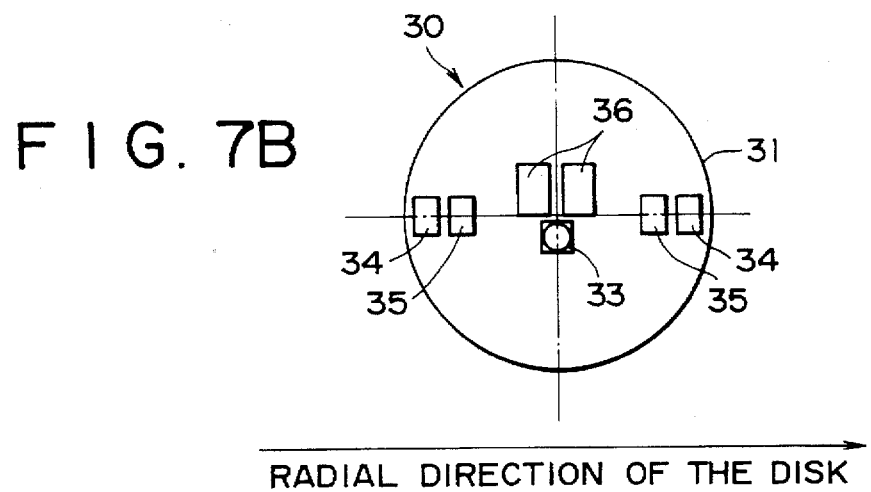

Next, the second embodiment of a disc identifying device of the present invention is shown in FIGS. 7A and 7B. The second embodiment having a disc identifying device incorporated in the tilt sensor is described.

FIG. 7A is a cross-sectional view for illustrating the structure for identifying the type of optical disc 1 using the tilt sensor 30 in which the disc identifying device is incorporated, and FIG. 7B is a top view of the tilt sensor 30 in which the disc identifying device is incorporated.

In FIG. 7A and 7B, the tilt sensor 30 comprises a base 31 on which a light emitter 33 and light receivers 34, 35, and 36 are mounted and a protector 32 for covering above the base. On the base 31, the light emitter 32 comprising a LED is provided at the center of the base, on both sides of the light emitter 33, a pair of tilt detection light receivers 36 is provided with interposition of the center line of the light emitter 33.

Two pairs of the first light receivers 35 and the second light receivers 34 are provided on both sides of the base 31 distantly each other in the radial direction of the disc.

In the tilt sensor 30 incorporated with the disc identifying device therein structured as described herein above, the light emitted from the light emitter 33 is irradiated onto the optical disc 1, and then diffracted and reflected. The first order diffracted light is received by the first light receiver 35 or the second light receiver. 34, when the optical disc 1 is a CD, the first light receiver 35 receives the first order diffracted light, on the other hand when the optical disc 1 is a DVD, the second light receiver 34 receives the first order diffracted light. The reason of such operations is described hereinbefore.

Therefore, when the first light receiver 35 outputs a light receiving signal, the disc identifying device judges that a CD is loaded, and on the other hand when the second light receiver 34 outputs a light receiving signal, the disc identifying device judges that a DVD is loaded.

If the optical disc 1 is not inclined, the zero order diffracted light reflected from the optical disc 1 returns on the light path of the incident light, however if the optical disc 1 is inclined, the light receiving signal from one tilt detection light receiver 36 is larger than that from another tilt detection light receiver 36 out of two tilt detection light receivers dependently on the inclination. Thereby, the inclination of the optical disc 1 is detected. As suggested herein above, in the second embodiment, the light source that is the light emitter 33 of the tilt sensor 30 is used for dual-purpose and also the base 31 is used for dual-purpose.

Figure 8:
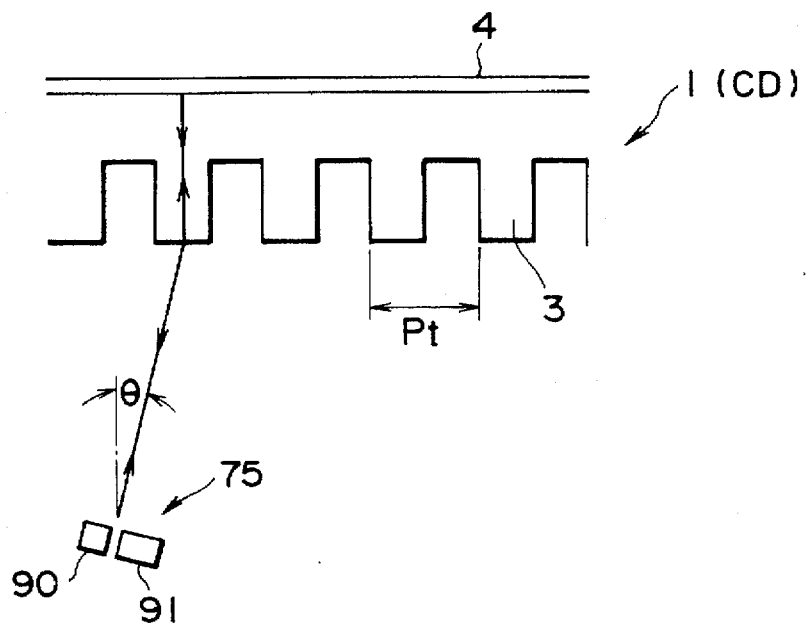
FIG. 8 is a schematic diagram for illustrating the principle of the third embodiment of a disc identifying device of the present invention.
Figure 9:
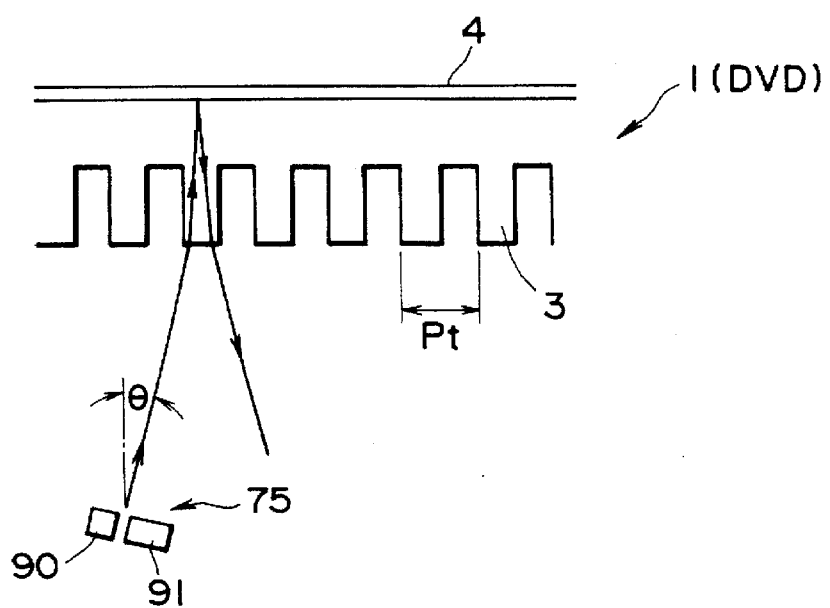
FIG. 9 is a schematic diagram for illustrating the principle of the third embodiment of a disc identifying device of the present invention.

Next, the principle of a disc identifying device of the third embodiment of the present invention is shown in FIGS. 8 and 9. In the third embodiment, the light receiver and light emitter of the disc identifying device is inclined to the optical disc 1.

FIG. 8 shows the case that the optical disc 1 is a CD. The identifying sensor 75 comprising a light emitter 90 and light receiver 91 located very closely to the light emitter 90 is inclined by a prescribed degree θ from the direction perpendicular to the plane of the optical disc 1. If the angle θ is about sixteen degrees, the first order diffracted light reflected on the reflecting film 4 of the optical disc 1 proceeds on the almost same passage of the incident light because the track pitch Pt of a CD is 1.6 μm. In other words, the first order diffracted light of the incident light from the light emitter 90 returns to the light emitter 90. The first order diffracted light which returns to the light emitter 90 is received by the light receiver 91.

On the other hand, when the optical disc 1 is a DVD, the first order diffracted light reflected on the reflecting film 4 of the optical disc 1 is reflected from the optical disc 1 without proceeding the same passage of the incident light because the track pitch Pt is 0.84 μm. In other words, if the angle θ is about sixteen degrees and the optical disc loaded on the optical disc player is a DVD, the first order diffracted light of the incident light from the light emitter 90 does not return to the light emitter 90. Therefore, the light receiver 91 does not receive the first order diffracted light for the DVD.

By applying the principle that in the case in which the identifying sensor 75 is inclined by a prescribed degree from the direction perpendicular to the plane of the optical disc 1 as described herein above, the light receiver 91 receives the first order diffracted light only when the track pitch of the optical disc 1 has a specified track pitch, the disc identifying device of the third embodiment of the present invention is capable of identifying an optical disc.

If the angle θ is about thirty degrees, only when a DVD is set, the first order diffracted light returns to the light receiver 91.

The identifying sensor 75 of a disc identifying device of the third embodiment of the present invention based on the principle described herein above is provided, for example, on a base unit of a disc player.

Figure 10:
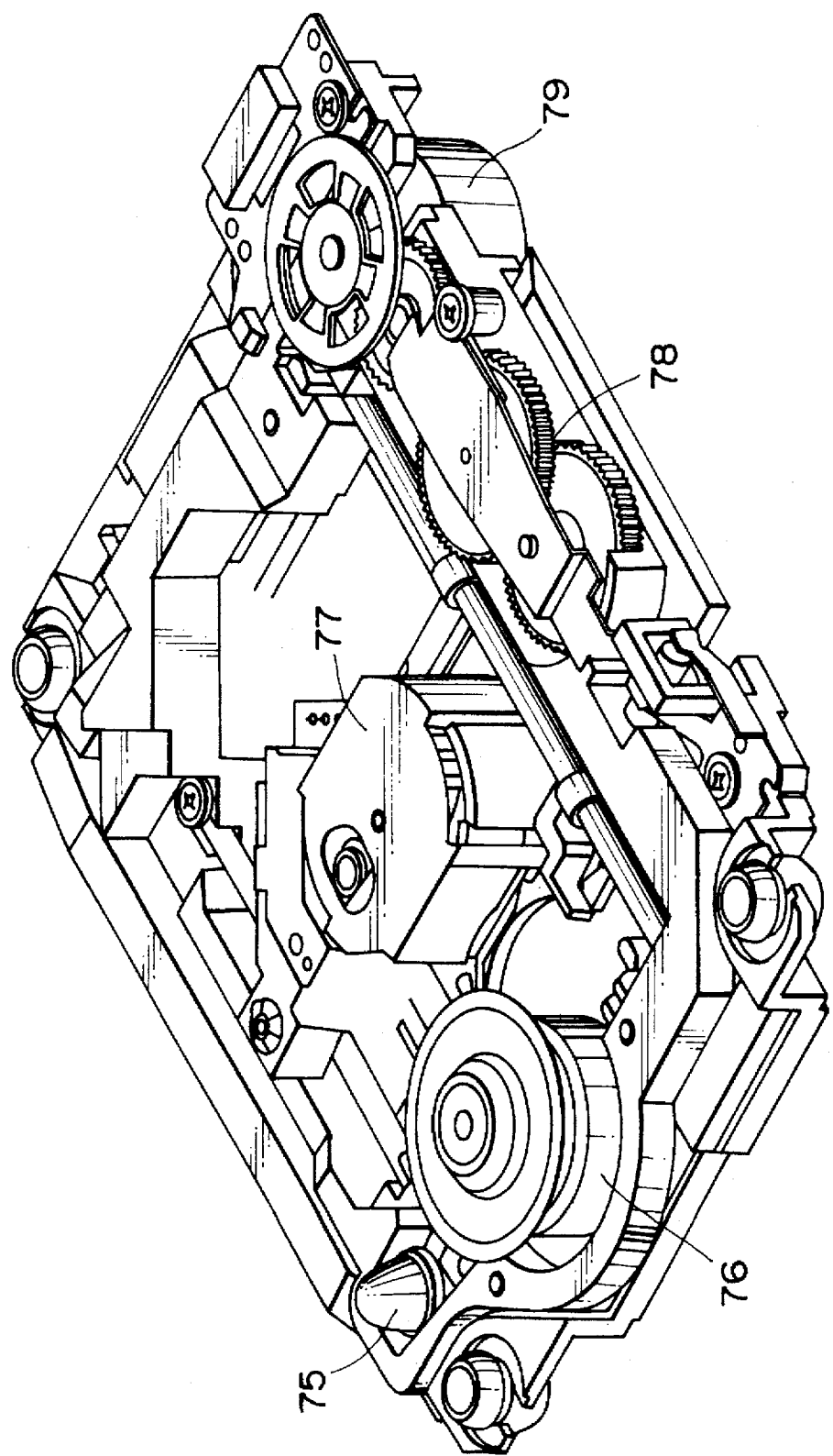
FIG. 10 is a diagram for illustrating the base unit of the third embodiment of a disc identifying device of the present invention for illustrating the location of the identifying sensor.

An example of the structure of a base unit is shown in FIG. 10, the identifying sensor 75 is fixed with inclination of a prescribed angle near a spindle motor 76 for rotational driving of the optical disc 1. A pickup 77 for reading data stored in the optical disc 1 is controlled so as to be moved in the radial direction of the optical disc 1 by a thread motor 79 and thread mechanism 78. The pickup 77 not shown in the figure is operated with focus control and tracking control.

Figure 11A:
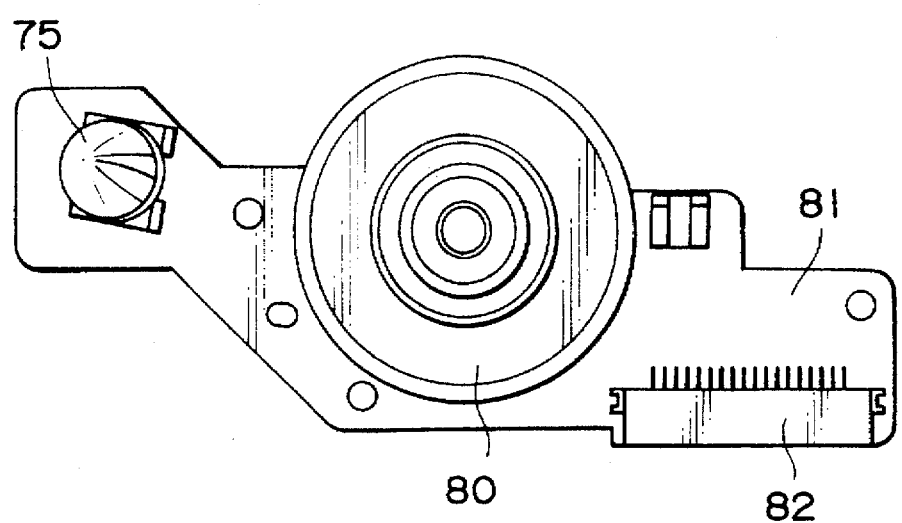
FIGS. 11A and 11B are schematic diagrams for illustrating the structure of a spindle motor base of the third embodiment of a disc identifying device of the present invention on which spindle motor base an identifying sensor is mounted.
Figure 11B:
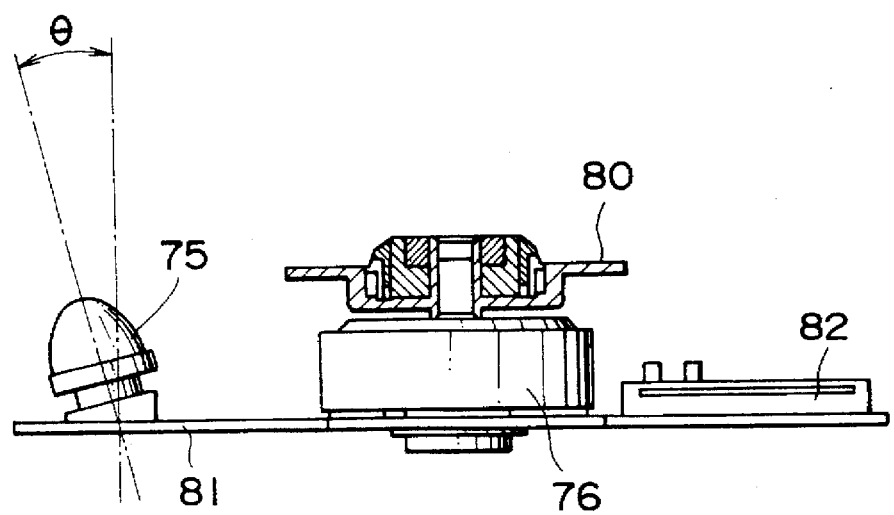

The identifying sensor 75 is mounted on the spindle motor base which is fixed on the base unit, the structure is shown in FIGS. 11A and 11B.

As shown in FIGS. 11A and 11B, the spindle motor 76 is provided on the spindle motor base 81, and the identifying sensor 75 is fixed on one end of the spindle base 81. The identifying sensor 75 is fixed on the spindle base 81 with a prescribed inclination angle θ. The structure of the identifying sensor 75 has a structure like the residue that the first light receiver 35 and second light receiver 34 are removed from the tilt sensor 30 shown in FIG. 7. In other words, the identifying sensor 75 of the third embodiment has the same structure as that of a tilt sensor which has been used conventionally, therefore it is not necessary to develop the identifying sensor 75 for this purpose.

In addition, a turn table 80 is fixed on the spindle motor 76, and the optical disc 1 is placed on the turn table for chucking. The spindle motor 76 is rotation-controlled by a control signal fed through a connector 82.

Figure 12:
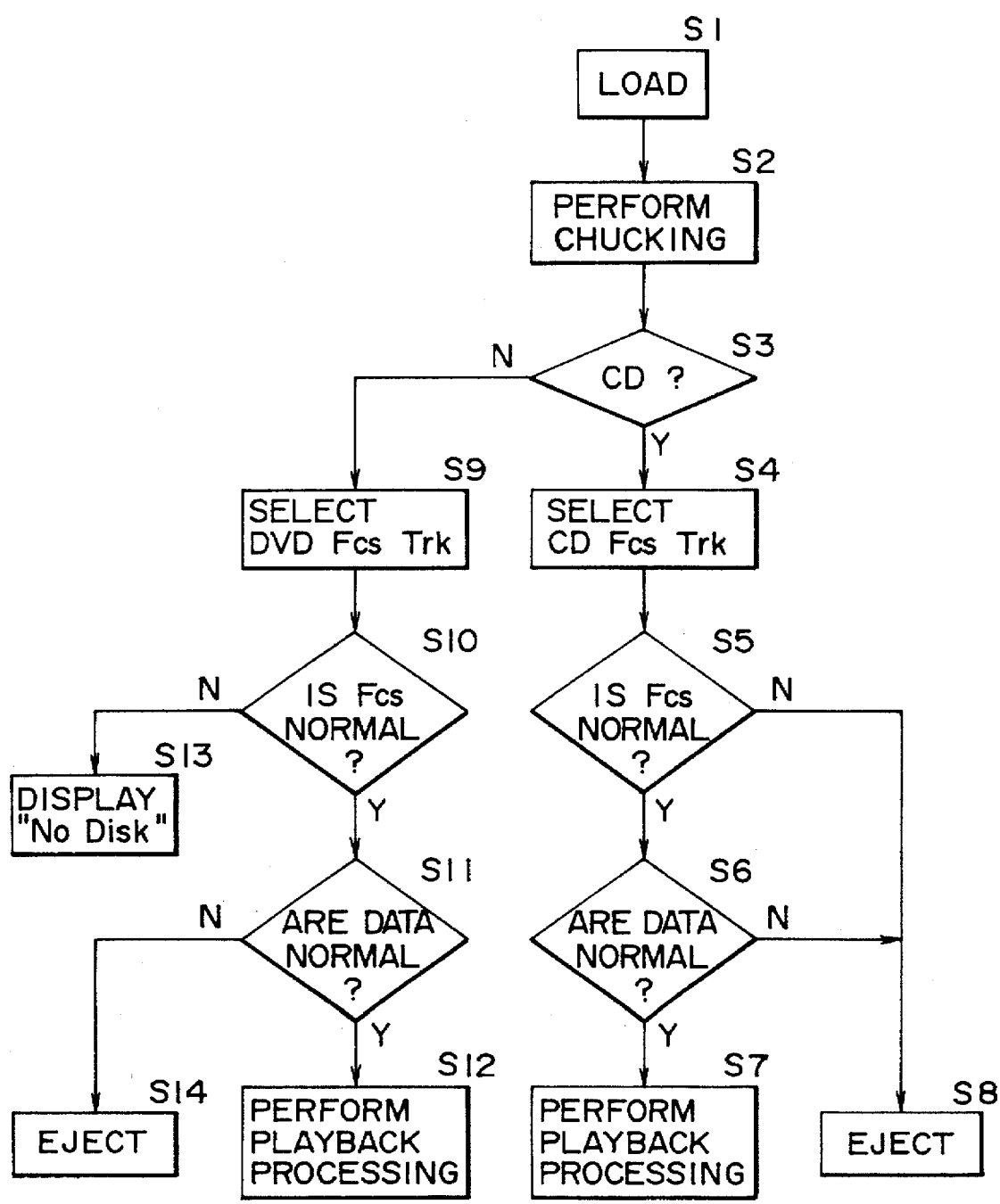
FIG. 12 is a flowchart for describing the operation of the third embodiment of a disc identifying device of the present invention.

Next, operations of the disc identifying device of the third embodiment of the present invention is described referring to a flowchart shown in FIG. 12.

When the optical disc 1 is loaded in the step S1, the optical disc 1 is chucked on the turn table 80 in the step S2. In the step 3, the loaded optical disc is identified whether the optical disc 1 is a CD or not. In this case, the identification depends on whether the identifying sensor 75 receives the first order diffracted light or not, wherein the inclined angle of the identifying sensor 75 is about sixteen degrees, therefore only when a CD is set, the light receiver 91 of the identifying sensor 75 receives the first order diffracted light.

If the optical disc 1 is a CD, the identifying sensor 75 receives the first order diffracted light and outputs the signal YES, and the process proceeds to the step S4. In the step S4, a focus servo control circuit 47 for CD and tracking servo circuit 50 for CD are selected (refer to FIG. 2 hereinbefore). Then in the step S5, it is judged whether the focus is operated normally. The controller 67 judges the focus based on an output of the error generation circuit 72, if the focus is operated normally, the process proceeds to the step S6.

In the step S6, the controller 67 judges whether the data are played back normally or not. If the data are normal, the process proceeds to the step S7 for playback processing.

If the focus is judged to be abnormal in the step S5 (N), that is, the optical disc 1 is placed with the face on the back, then the optical disc 1 is ejected in the step S8. If the data is played back abnormally in the step S6, that is, the optical disc 1 is an abnormal disc, the optical disc 1 is ejected in the step S6.

On the other hand, when a DVD is loaded, the judgment in the step S3 is NO (N) and the process proceeds to the step S9, then the focus servo control circuit 48 for DVD and tracking servo circuit 51 for DVD are selected (refer to FIG. 2 hereinbefore). Then, the controller 67 judges whether the focus is operated normally or not in the step S10. The controller 67 judges based on an output of the error generation circuit 72, if the focus is normal, the process proceeds to the step S11.

In the step S11, whether the data are played back normally or not is judged. This judgment is operated also by the controller 67, if the data are normal, the process proceeds to the step S12 for playback processing.

If the focus is judged to be abnormal (N) in the step S10, that is no optical disc 1 is set, then No Disk signal is displayed on a display in the step S13. If the data are played back abnormal in the step S11, that is the optical disc 1 is an abnormal disc, the optical disc 1 is ejected in the step S14.

In the first to third embodiments described hereinbefore, LED is used as the light source of the light emitter, the light source is by no means limited to LED in the invention, a laser diode may be used as the light source.

In the first to third embodiments, the first order diffracted light is used for identifying the type of disc, however a diffracted light of the higher order than the first order such as the second order diffracted light may be used.

In the second embodiment, the tilt sensor is commonly used, but an LED for identifying disc diameter may by used also as a light source for identifying the type of disc.

In the third embodiment, the identifying sensor may be provided on the pickup.

In the first to third embodiments, the identification between a CD and DVD is described, but the present invention is by no means limited to the case, and the present invention may be applied to identify other discs with different track pitch. In this case, in the first and second embodiments, the number of light receivers is increased to identify many types of disc of three or more.

In the third embodiment for identifying three types of disc, two identifying sensors are proved to identify two types of disc, and when both two identifying receivers do not receive the diffracted light, the optical disc 1 is judged to be a third type optical disc.

As the present invention is structured as described hereinbefore, by using diffracted light which has a diffracted angle different depending on track pitch formed on the disc, the type of disc is identified, and the structure needed for identification is simple.

Angles of diffracted lights of the same order corresponding to different track pitches of the disc deviate each other by several degrees, therefore a disc having a different track pitch can be identified consistently. In this case, by prescribing the incident angle of the incident light to deviate by a certain degree from the direction perpendicular to the plane of the optical disc, the diffracted light returns toward the light source for a specified type of disc, therefore the light source and light receiver can be unified.

In the second embodiment, the light source such as tilt sensor is used also for identifying the type of disc, in this case, a space dedicated to the light source is not necessary.

According to the third embodiment, only by providing a conventional tilt sensor with an inclination of a certain degree, the tilt sensor is served as an identifying sensor for identifying the type of disc, it is not necessary to develop a new identifying sensor dedicatedly.

What is claimed is:

1. A disc identifying method in which a light is irradiated onto a disc, the light is diffracted by the track formed on said disc to generate diffracted lights with different diffraction angles, by utilizing said difference in diffraction angle of diffracted lights other than the first order diffracted light dependent on the pitch of said track, the type of said disc with a different track pitch is identified.

2. The disc identifying method as claimed in claim 1, wherein a light receiving means is provided at the position on the passage of any one of diffracted lights having diffraction order of the first or higher with diffraction angle different dependent on pitch of said track, the type of said disc is identified based on a light receiving output from said light receiving means.

3. The disc identifying method as claimed in claim 1, wherein the angle of the incident light onto said disc is prescribed to be deviated angularly by a certain degree from the direction perpendicular to the plane of said disc, and the angle is prescribed so that the diffracted light of the first order or higher order diffracted by a specified type of disc out of various discs returns through the path of the incident light toward the light source.

4. A disc identifying device provided with a light source for irradiating a light onto a disc, and a plurality of light receiving means corresponding to the number of disc types to be identified for receiving any one of diffracted lights of the first order and higher order diffracted by the track formed on said disc, wherein said plurality of light receiving means is provided at the positions corresponding to each diffraction angle of said diffracted lights different dependent on pitch of said track which is different for each disc type, and the disc type is identified based on a light receiving signal.

5. A disc identifying device provided with;

a light source for irradiating a light onto a disc, first light receiving means for the zero order diffracted light diffracted by the track formed on said disc, and a plurality of second light receiving means corresponding to the number of disc types to be identified for receiving any one of diffracted lights of the first order and higher order diffracted by the track formed on said disc, wherein said first light receiving means detects the tilt angle of said disc corresponding to the light receiving position where said zero order diffracted light is received, and said plurality of second light receiving means is provided at the positions corresponding to each diffraction angle of said diffracted lights different dependent on pitch of said track which is different for each disc type, and the disc type is identified based on a light receiving signal.

6. A disc identifying device provided with a light source for irradiating a light onto a disc with an angle deviated by a certain degree from the direction perpendicular to the plane of said disc, and a light receiving means provided very closely to said light source and for receiving any one of diffracted lights of the first order and higher order diffracted by the track formed on said disc of the specified type out of various disc types, wherein only when said light receiving means receives a light receiving signal, said disc is judged to be a disc of said specified type.

* * * * *